R. GURLEY.
Railway-Switch Bar.

No. 205,379.                    Patented June 25, 1878.

WITNESSES:
A. B. Robertson
Solon C. Kemon

INVENTOR:
Royal Gurley
BY
ATTORNEYS.

UNITED STATES PATENT OFFICE.

ROYAL GURLEY, OF MEADVILLE, PENNSYLVANIA.

IMPROVEMENT IN RAILWAY-SWITCH BARS.

Specification forming part of Letters Patent No. 205,379, dated June 25, 1878; application filed May 21, 1878.

*To all whom it may concern:*

Be it known that I, ROYAL GURLEY, of Meadville, in the county of Crawford and State of Pennsyvania, have invented a new and useful Improvement in Devices for Connecting Railway-Switch Rails; and I do hereby declare that the following is a full, clear, and exact description of the same.

My invention is an improvement in the class of devices used, independently of ties or sleepers, for connecting switch-rails, so as to hold them parallel, and thus preserve the gage of the track.

The invention consists in the construction and combination of parts, as hereinafter described.

Figure 1:
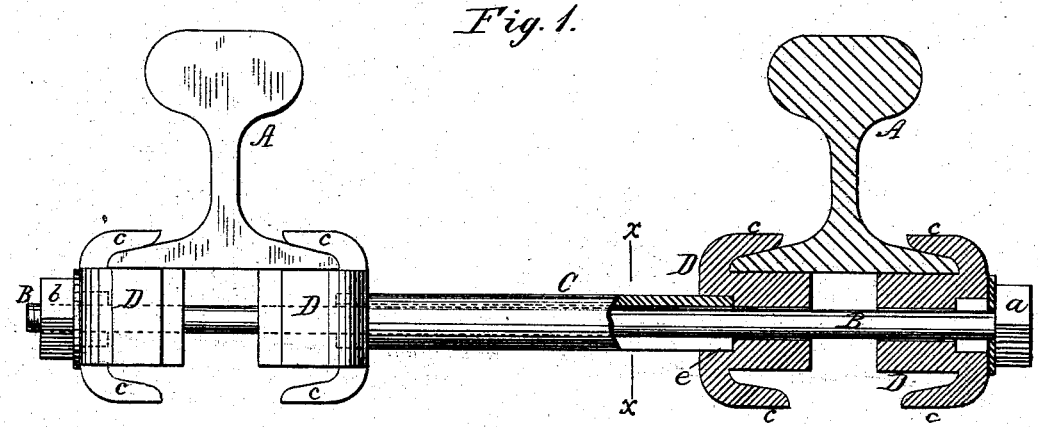
Figure 2:
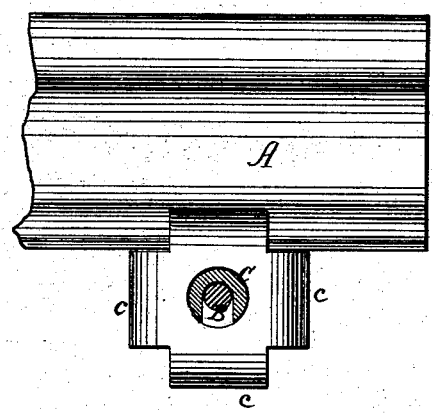

In the accompanying drawings, forming part of this specification, Figure 1 is a partly-sectional view, showing the application of my improved means for connecting switch-rails. Fig. 2 is a cross-section on line $x\,x$, Fig. 1.

A A are the switch-rails, which are connected by the following-named devices, to wit: a tie-rod, B, having a head, $a$, on one end and a screw-nut, $b$, on the other, a slotted tube, C, which serves to hold the rails apart, and clamps D, having each a number of claws, $c$, for embracing the base of the rails, and provided with circular recesses or sockets to receive the ends of the spacing-tube C.

The clamps D are formed of a perforated rectangular block having curved flanges, one on each side, which constitute the claws $c$, whose function is to embrace one edge of the flanged base of the rails.

The object of constructing the clamps with more than one claw is to obviate the necessity of removing a clamp from a tie-rod, A, and substituting another therefor in case of a claw being broken off. As it is, by loosening the nut $b$ and rotating a clamp, another claw may be brought into position to embrace the base of a rail. The function of the tube C is to hold the rails the requisite distance apart, and thereby assist in preserving the gage of the track. The tube has a lengthwise slot, $c$, of sufficient width to allow the tube to be detached from the rod B by lifting it off in case the rod should be bent or broken. The ends of the tube enter the circular recesses $e$ in the clamps D, so that when the nut $b$ is screwed home, and the inner and outer clamps are thereby forced against the rails, the parts will have a more rigid connection than if the ends of the tube merely abutted the flat sides of the clamps.

I am aware it is not new to employ tie-rods and spacing-tubes to connect the rails of tramways; also, that tie-rods and clamps have been employed to connect other rails; and I do not claim such combinations.

What I do claim is—

1. The combination, with switch-rails A A, of the gage-tube, the clamps having claws $c$, and provided with recesses $e$ to receive the ends of the tube, and the tie-rod having head $a$ and screw-nut $b$, all as shown and described.

2. The combination, with the tie-rod and adjustable clamps, of the tube, having a lengthwise slot to permit its convenient detachment, as specified.

ROYAL GURLEY.

Witnesses:
JOSEPH HALLAR,
L. BARR.